May 7, 1968 R. J. GRUENSTEIN 3,381,930
MOLD FOR INVERTED CIRCUITRY
Original Filed April 10, 1964 8 Sheets-Sheet 1
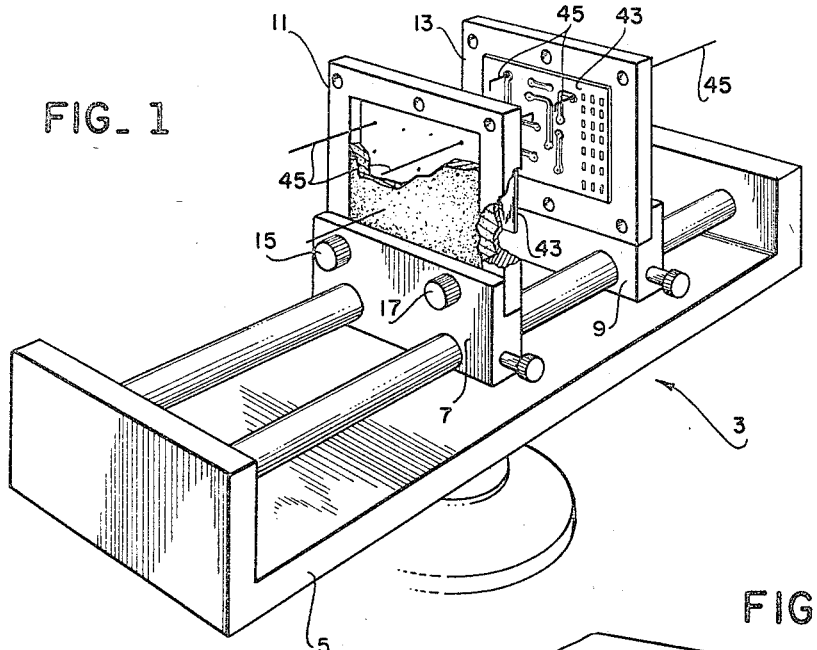
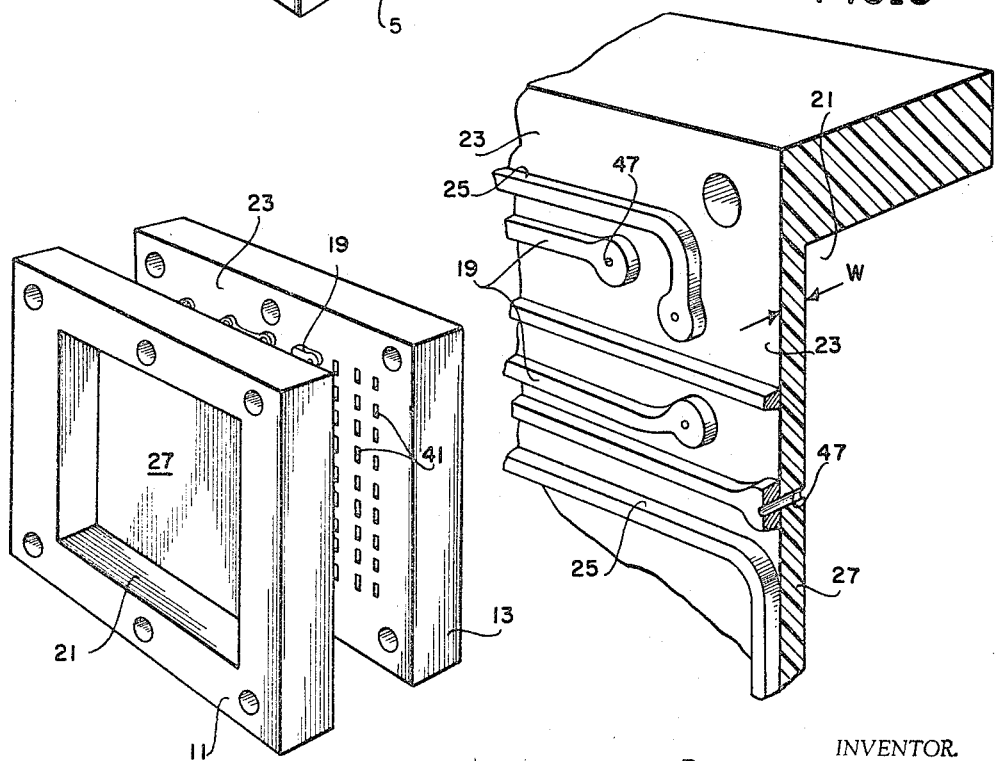
INVENTOR.
ROLF J. GRUENSTEIN
BY George C. Sullivan
Agent

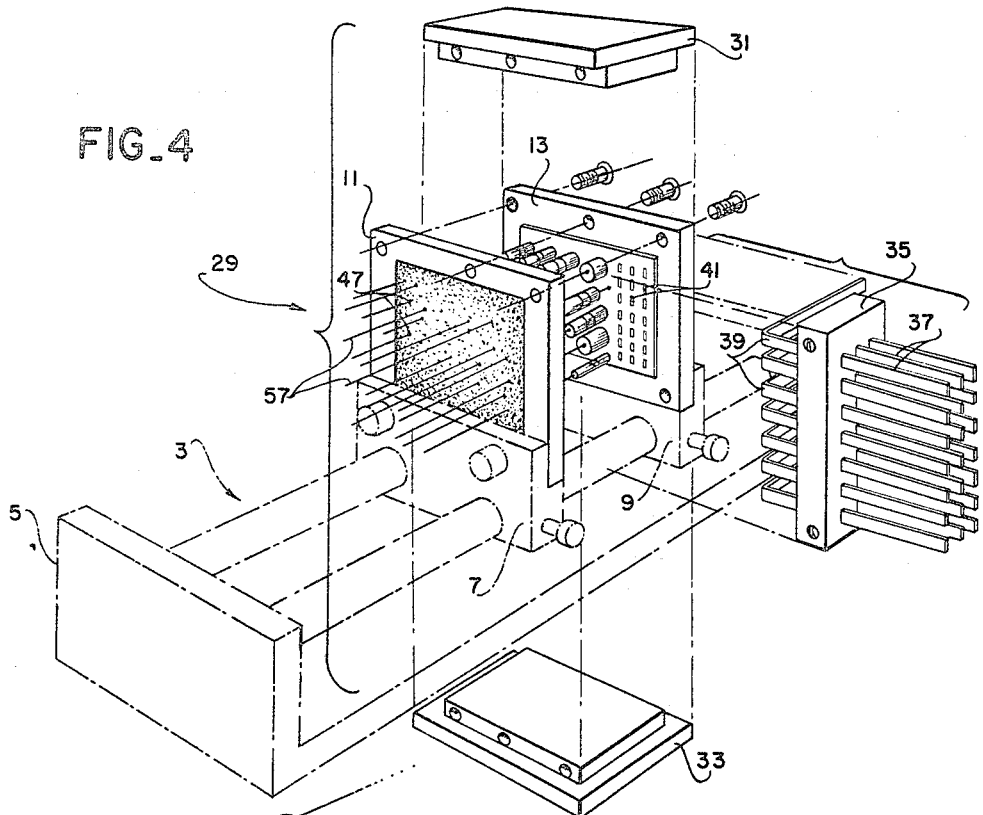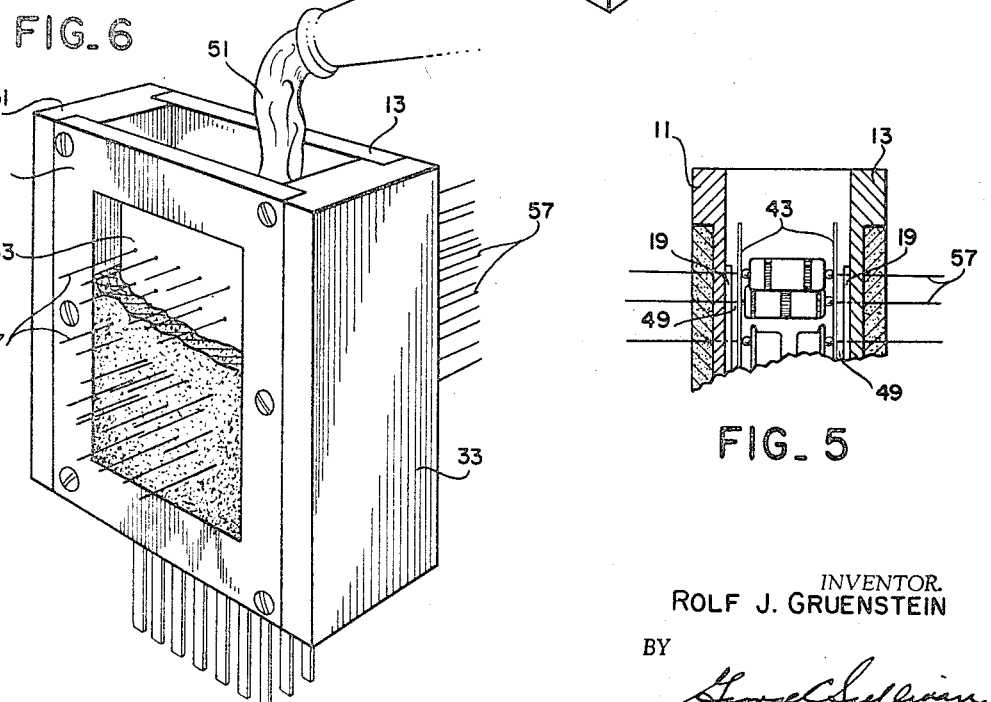

May 7, 1968 R. J. GRUENSTEIN 3,381,930
MOLD FOR INVERTED CIRCUITRY
Original Filed April 10, 1964 8 Sheets-Sheet 3
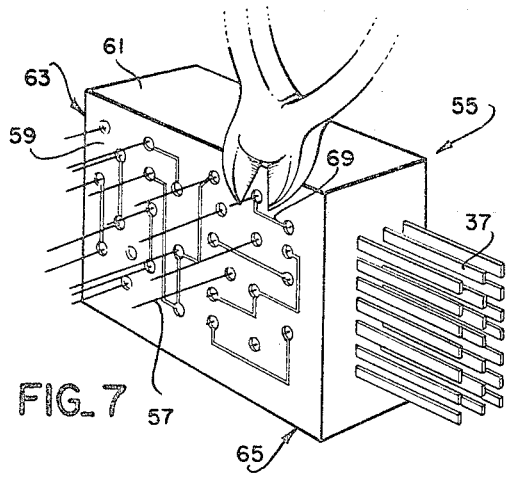
FIG. 7
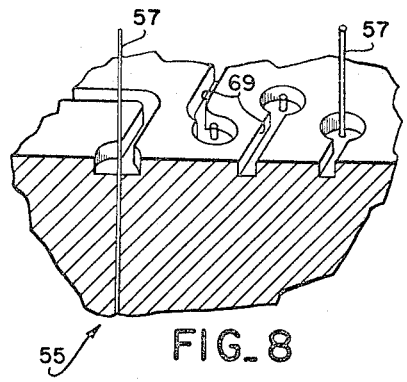
FIG. 8
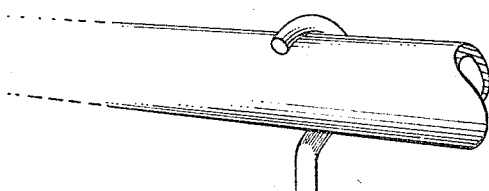
FIG. 10
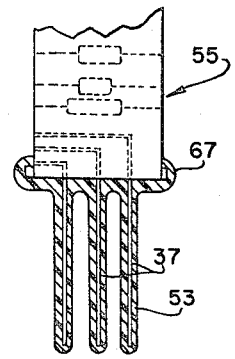
FIG. 9
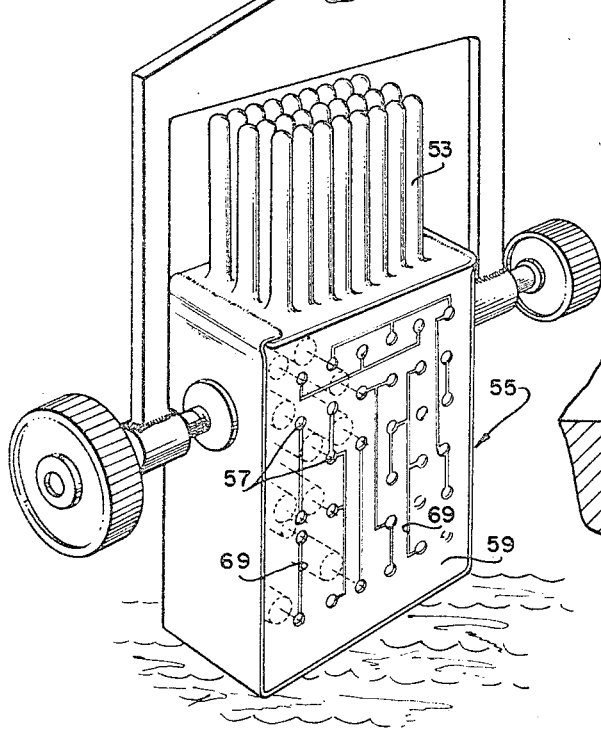
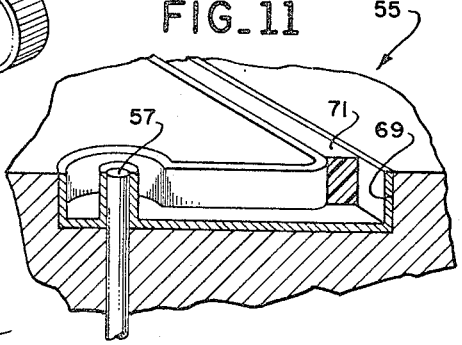
FIG. 11
INVENTOR.
ROLF J. GRUENSTEIN
BY
George C. Sullivan
Agent INVENTOR.
ROLF J. GRUENSTEIN
BY George Sullivan
Agent

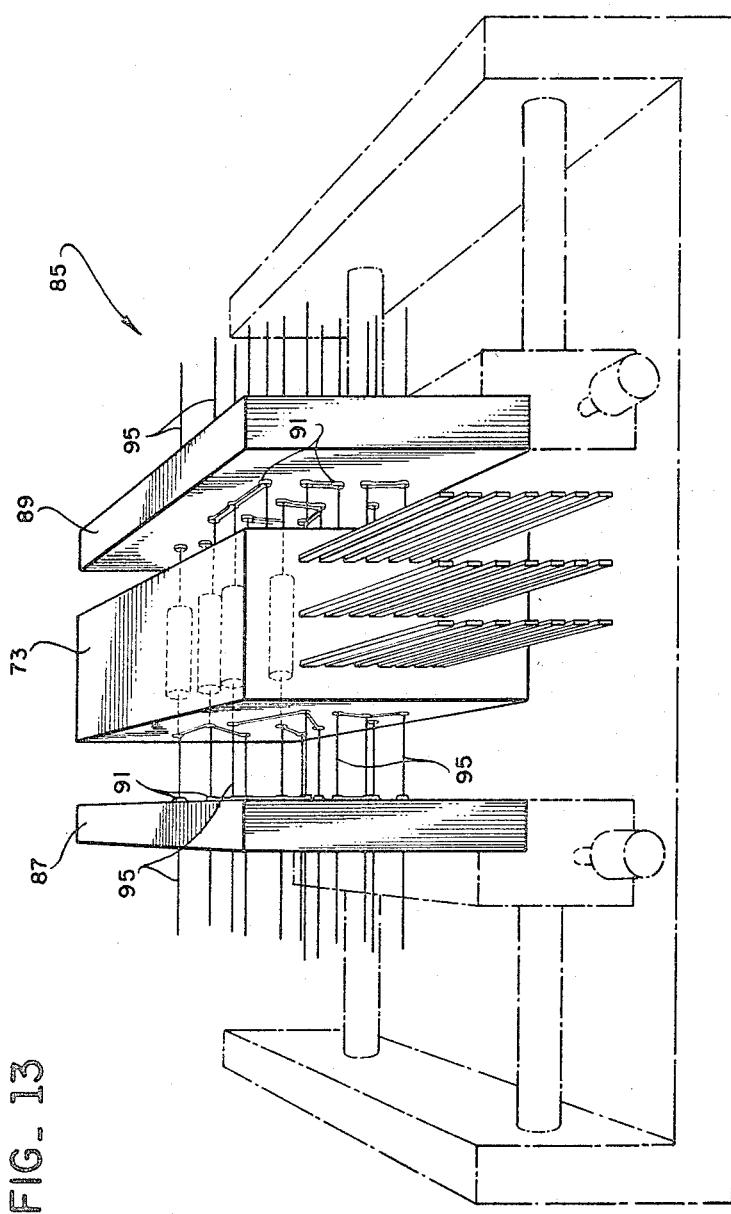

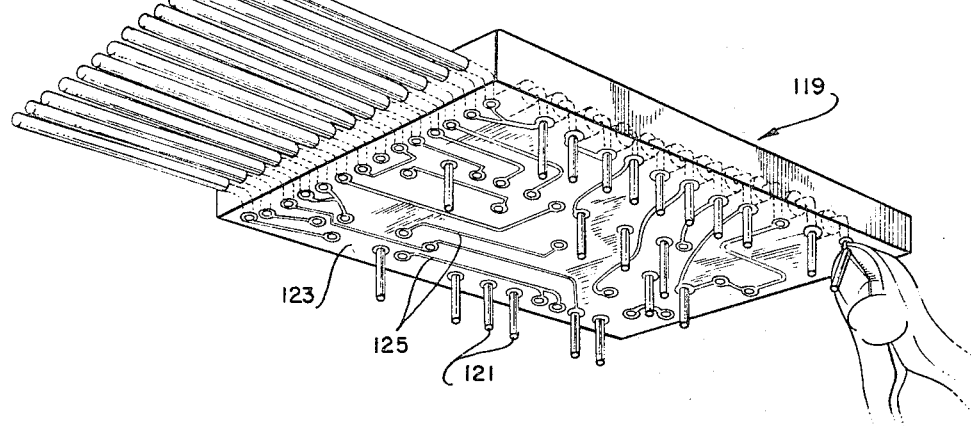
FIG_16
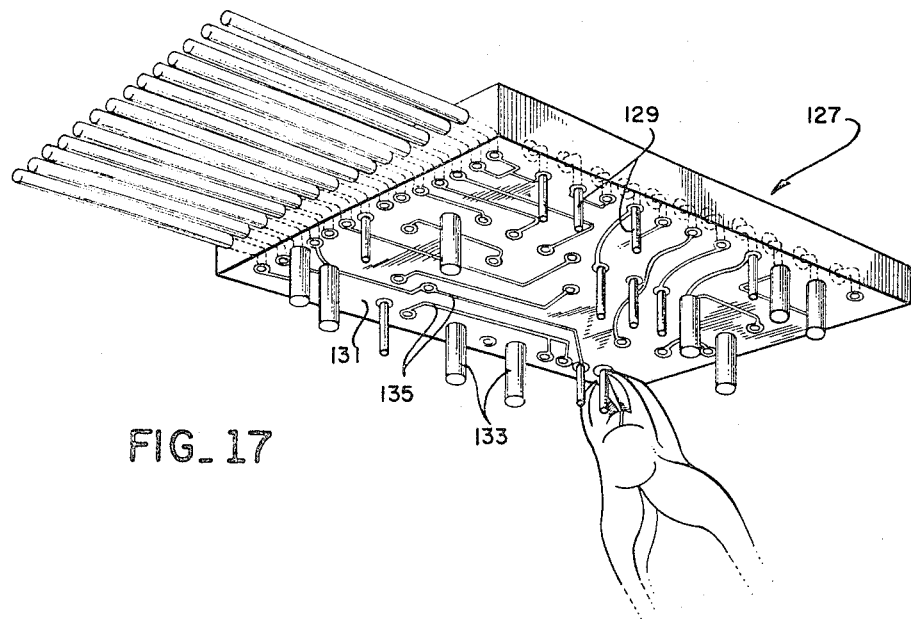
FIG_17

INVENTOR.
ROLF J. GRUENSTEIN

United States Patent Office 3,381,930
Patented May 7, 1968

3,381,930
MOLD FOR INVERTED CIRCUITRY
Rolf J. Gruenstein, Sunnyvale, Calif., assignor to Lockheed Aircraft Corporation, Burbank, Calif.
Original application Apr. 10, 1964, Ser. No. 358,824. Divided and this application June 28, 1966, Ser. No. 574,480
3 Claims. (Cl. 249—140)

This application is a division of my copending application Ser. No. 358,824, filed Apr. 10, 1964, now abandoned.

The present invention relates to a mold used in the technique for manufacturing electronic circuitry and more particularly to a technique wherein the circuit connections are made by depositing conducting material into channels and on the component lead wires.

The method of manufacturing the electronic module is predicated upon a plurality of steps which result in the interconnection of a plurality of component lead wires in a predetermined manner without the necessity of soldering, welding, dip soldering or using any other of the conventional techniques employed for interconnecting the circuitry traces to the component lead wires. This is made possible by utilizing a raised circuit pattern on the interior surface of the molding jig. The jig is then loaded or assembled with the proper electronic components and then filled with an encapsulating material such as epoxy. After curing of the epoxy, the module block is removed from the mold and the component lead wires are trimmed flush with the surface of the epoxy. The next step is to clean and sensitize the epoxy and then to deposit copper on the entire surface. This surface upon which the copper is deposited consists of the channels formed by the raised circuit pattern, the entire surface of the module and the protruding component lead wires. The final step is to remove all of the deposited copper from the surface of the module exclusive of the circuitry channels and the component lead wires. The completion of this copper removal step results in the final module which has the electrical components interconnected by means of the copper deposition into the circuitry channels and onto the lead wires.

In view of the foregoing it can be seen that an electronic module is provided which obviates the necessity of individually connecting the component lead wires to each individual circuit trace of the module and still provides a highly reliable and inexpensive module.

The basic concept is uniquely adaptable to many different types of circuits. For example, this technique may be used for single-layer, double-sided circuitry, multilayer double-sided circuitry, single-sided single-layer circuitry and single-sided multi-layer circuitry. These four embodiments are hereinafter discussed in greater detail.

The specific nature of the invention as well as the objects, uses and advantages thereof will clearly appear from the following description and from the accompanying drawings in which:

FIGURE 1 is a drawing of the assembly fixture of the first embodiment of the present invention.

FIGURE 2 is a drawing illustrating the cricuit tool plates employed in the assembly fixture of FIGURE 1.

FIGURE 3 is an enlarged section of FIGURE 2.

FIGURE 4 is an exploded view of the molding jig of the first embodiment of the present invention.

FIGURE 5 is a side elevation, in section, of the components in place within the molding jig of FIGURE 4.

FIGURE 6 is a pictorial view of the encapsulation process used in the present invention.

FIGURE 7 is a pictorial view of the module after encapsulation.

FIGURE 8 is an enlarged sectional view of FIGURE 7.

FIGURE 9 is a side elevation of the module of FIGURE 7 after the outside connections have been dip coated.

FIGURE 10 is a pictorial view of the module which has been prepared for the chemical processing.

FIGURE 11 is an enlarged sectional view of the module of the first embodiment of the present invention after the deposition process and the surface conductor material has been removed.

FIGURE 13 is a pictorial view of the module of the second embodiment of the present invention which is mounted in the jig prior to the formation of the second layer of circuitry.

FIGURE 16 is a pictorial view of the module after encapsulation by the technique shown in FIGURE 15.

FIGURE 17 is a pictorial view of the module used in the formation of the fourth embodiment of the present invention.

Figure 12:
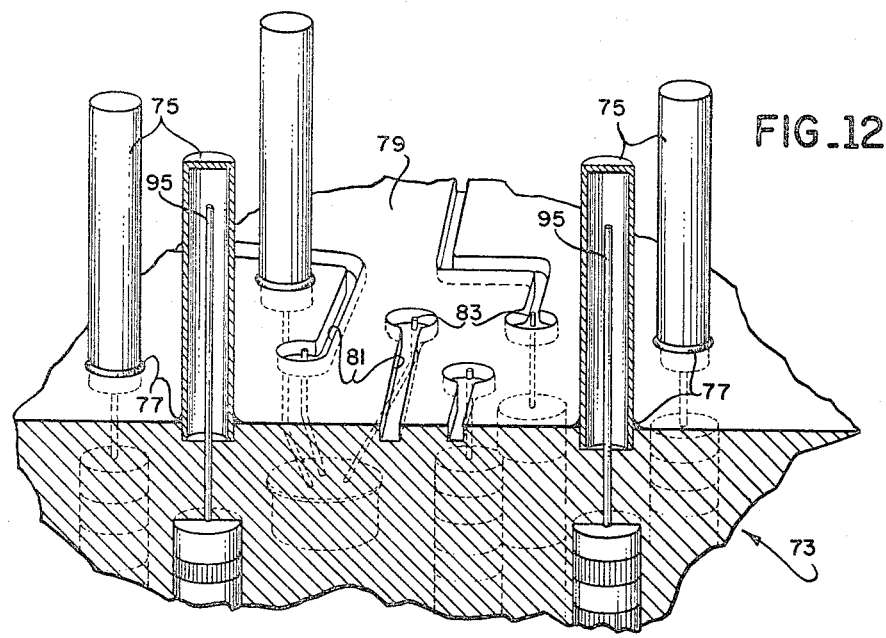
FIGURE 12 is an enlarged sectional view of the module of the second embodiment of the present invention after removal from the encapsulation process.
Figure 14:
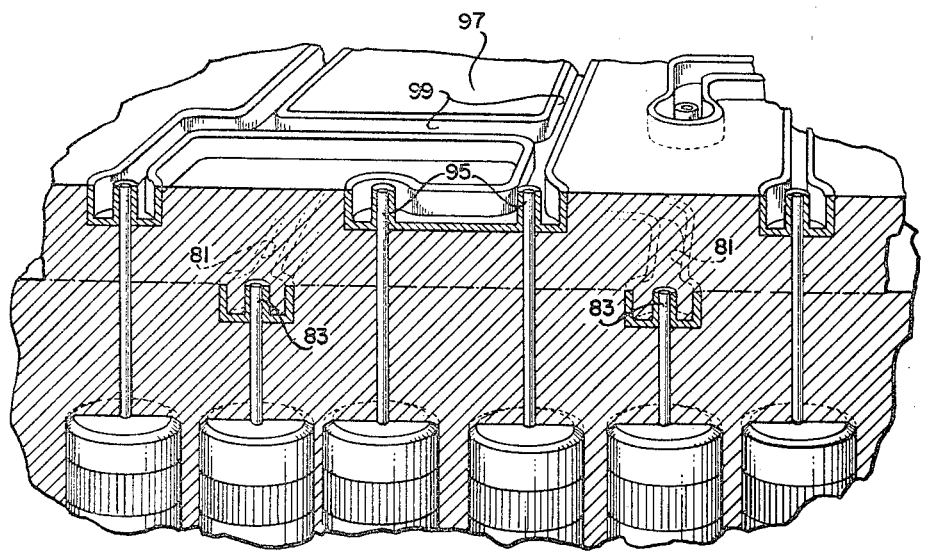
FIGURE 14 is an enlarged sectional view of the module of the second embodiment of the present invention illustrating the two layers of circuitry on one side of the module.
Figure 15:
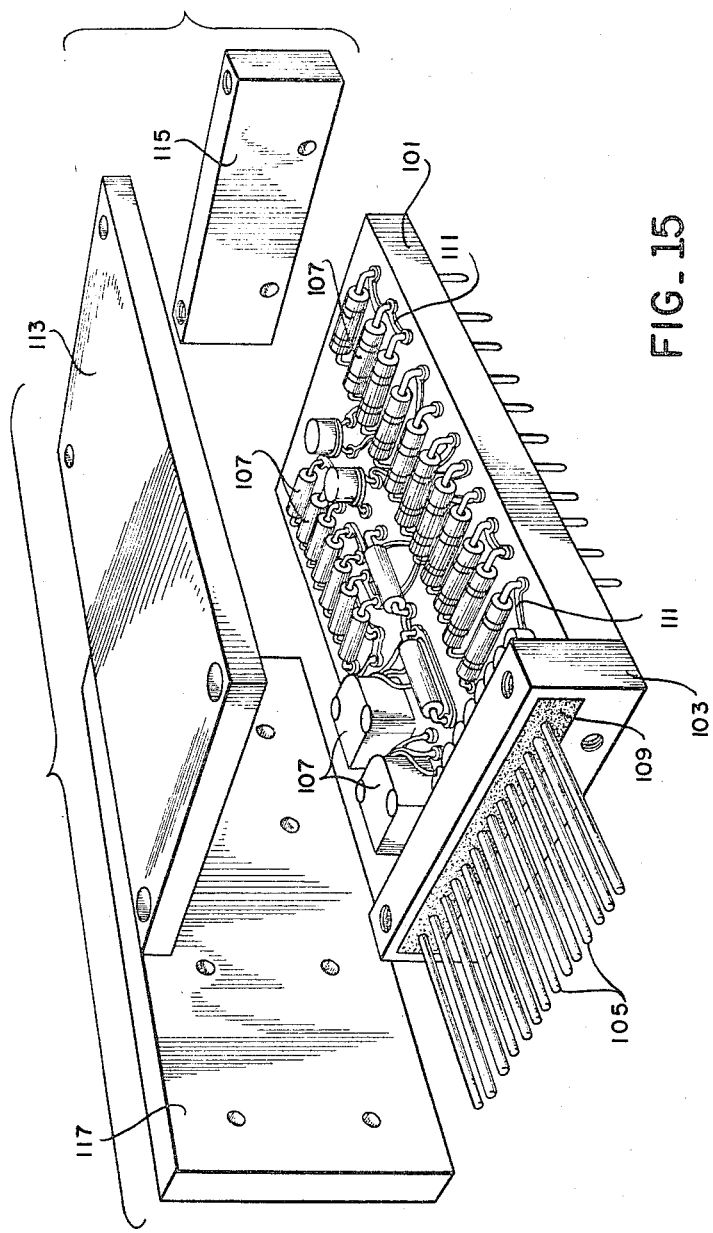
FIGURE 15 is an exploded pictorial view of the circuit tool plate, components and mold elements of the third embodiment of the present invention.

The first embodiment of the present invention is depicted in FIGURES 1 through 11, the second embodiment in FIGURES 12 through 14, the third embodiment in FIGURES 15 through 16, and the fourth embodiment in FIGURES 17 through 20. As will hereinafter become apparent, some of the drawings illustrating one embodiment are referred to in the description of another embodiment.

Referring now to the first embodiment of the present invention, the sequence of steps and the end product are depicted in FIGURES 1 through 11.

In FIGURE 1 is illustrated assembly fixture 3 consisting of base plate 5 and assembly fixture carriages 7 and 9, respectively, in predetermined and adjustable spaced relationship. Operatively connected to carriages 7 and 9 are circuit tool plates 11 and 13 the details of which are particularly illustrated in FIGURES 2 and 3. The assembly fixture carriages and circuit tool plates are interconnected, for the duration of the loading or assembly of electrical components, by means of mounting screws 15 and 17.

FIGURES 2 and 3 illustrate circuit tool plates 11 and 13 which form two sides of the over-all molding jig structure which is more particularly illustrated in FIGURES 4 and 6. Each of these circuit tool plates has raised circuit traces 19 and cavity 21. The formation of raised circuit traces 19 may be achieved by several different techniques. It has been found that a particularly satisfactory technique employs a copper-clad laminated epoxy board which is treated with photo resist and exposed with a negative of a particular circuit. After this exposure the copper-clad laminated epoxy board is chemically etched which results in the removal of the copper in the non-sensitized areas 23 as depicted in FIGURES 2 and 3. It will be appreciated that other techniques may be used to form the raised circuit traces such as by mechanical milling, engraving or precision grinding or the like. However, the etching technique is particularly advantageous inasmuch as it provides vertically extending surface 25 of the raised circuit traces 19 with a slope. As will hereinafter become apparent, this sloping surface provides ease of removal of circuit tooling plates 11 and 13 after the encapsulation process has been completed. It has been found possible and desirable by using this technique for the raised circuit traces to have a heighth of approximately .030 inch and a width, at the upper surface, of .030 inch. It will be appreciated that these dimensions may be varied provided the herinafter-described functions and proper electrical and mechanical characteristics are achieved. Lead wire cavity 21 is formed in circuit tool plates 11 and 13 such that the laminated epoxy board wall 27 has a thickness W (see FIGURE 3) of about .1 inch. It will be appreciated by those skilled in the art that the circuit tool plates 11 and 13 may be formed by many different techniques and from different types of material. As will hereinafter be explained more completely, lead wire cavity 21 is filled with a silastic material which prevents the escape of encapsulating material during the encapsulation process. In addition, the silastic material prevents the components from shifting during the loading process and the thinness of wall 27 in combination with the silastic material make it possible to easily remove circuit tooling plates 11 and 13 over the component lead wires after the encapsulating material has set and thereby obviates injury to the component lead wires.

In FIGURE 4 is illustrated an exploded view of molding jig 29 which consists of circuit tool plates 11 and 13, side plates 31 and 33 and header plate 35. These plates are interconnected by means of bolts as shown; however, one skilled in the art will appreciate that many alternative connecting techniques could be employed and remain within the scope of the present invention. It will be particularly noted that header plate 35 has a plurality of connector pins having outside extensions 37 and inside extensions 39. The inside extensions 39 are inserted through openings 41 which are provided in circuit tool plate 13. It is to be understood that these inside extensions could extend through either or both of circuit tooling plates 11 and 13 depending upon design and circuit requirements. It will be appreciated that standard or commercially available connectors may be used in place of plate 35 and outside and inside extensions 37 and 39. This may be achieved by encapsulating the standard connector in place. As best depicted in FIGURE 5, positioning film 43 is provided which has the component identifications printed thereon for locating purposes. In this embodiment, two positioning films are provided which are respectively placed adjacent to circuit tooling plates 11 and 13. From FIGURE 1 it can be seen that these films are slidably attached by means of pins 45 which are inserted through lead wire hole 47. After the pins are in place, the electronic components are mounted by inserting the lead wires thereof through the openings in the positioning film and through the circuit tool plates. After a few components have been inserted in place, then pins 45 may be removed and the lead wires of electrical components are inserted instead. It will be appreciated that the positioning film may be slid back and forth upon the lead wires between the base of the electrical component and the surface of traces 19 of tooling plates 11 and 13. After all components have been inserted in place, positioning film 43 is slid against the surface of the electrical components which thereby provide space 49 between the positioning film and the raised circuit traces 19 as particularly illustrated in FIGURE 5. A particularly advantageous feature of the present invention is that, after all of the components have been mounted in place, an electrical systems continuity check may be made by connecting the lead wires in a predetermined manner which may be achieved by either jumper wires or by inserting a printed circuit plate or similar test fixture over the lead wires wherein the plate has the necessary electrical interconnections and contacts. However, this cannot be done in case all metal circuitry tool plates are utilized.

As shown in FIGURE 6, the next operation is to encapsulate the electrical components. This is achieved by poring an encapsulate material 51 into the cavity formed between the previously-described circuit tool plates. It is to be understood that there are many encapsulating processes which are applicable with this module manufacturing technique such as atmospheric or vacuum encapsulation, the use of different encapsulating materials and the like. It will be particularly appreciated that silastic material 53 which may consist of many different generally available silastic materials, provides several unique functions. These functions are (1) it prevents escape of the encapsulate material 51, (2) it firmly holds the lead wires during the loading operation, and (3) it provides only sufficient frictional contact with the lead wires to allow plates 11 and 13 to be removed after the encapsulation process has been completed.

After the encapsulate material has cured, the molding jig is disassembled and module 55 is removed as illustrated in FIGURE 7. Then the component lead wires 57 are cut such that the ends thereof are flush with surface 59 of module 55. This is generally shown in FIGURE 7 and more specifically illustrated in FIGURE 8 which is an enlarged and sectional view of FIGURE 7.

To assure completely clean component leads, an end mill type tool, which may be of the hollow two flute rotating type, may be used over each lead and bottomed out on the inside of the circuitry channel. This will remove any residue left from the encapsulation process on the component leads and cut a flat base around the protruding component leads. After the component lead wire cutting and cleaning processes have been completed, then masking tape or the like is applied to surfaces 61, 63 and 65. In addition, a protective material is attached to outside connections 37 by dipping these pins into silastic or plastic material. A molding ridge 67, as best shown in FIGURE 9, is provided on the surface of the module such that the silastic or plastic material 53 will be firmly attached thereto as well as to the pins. In this manner the connector pins are protected from any material which might otherwise come in contact with them during the hereinafter-described chemical and electrochemical process.

After completion of this masking process, all of the exposed areas are vapor honed or precision sand blasted and cleaned to remove any contaminants which might be thereon. Then the entire module is sensitized by any of several processes such that a conducting material may be chemically deposited thereon. The purpose of this sensitizing process is to allow the deposition of copper, for example, without the utilization of electrical current.

As generally depicted in FIGURE 10, the sensitized module is placed in different solutions for the deposition of copper or other conducting material on surface 59, channels 69 and cut lead wires 57, as well as the masked off areas. The particular process employed for this copper deposition is not described herein inasmuch as there are several known processes which may be used to achieve this copper deposition. One process which has been used for this purpose is known as the "Shipley Process" by those skilled in the art.

After this electroless process has been completed, the entire module is put into a tank for copper electro-plating all of surfaces 69, 57 and 59 and masked off areas. It will also be noted that all of the masking material will be plated with copper. After all of the exterior surface, including the masked off areas, has been plated, the masking material is removed thereby exposing surfaces 61, 63, 65 and outside extensions 37. Then epoxy material 71 is placed in all of the channels of the trace circuitry pattern.

The next step is to remove the copper material deposited on surface 59. This may be achieved by several processes including grinding, lapping or chemical etching. It can therefore be seen that the function of epoxy 71 is to prevent the edges of the copper deposited in the channels and the lead wires from being injured during the grinding or lapping process or to prevent etching solution from coming in contact with the external surface of the lead wire and the copper deposited in the channels.

In FIGURES 12, 13 and 14 is illustrated another embodiment of the present invention. This embodiment consists of a technique by which a double-sided, multi-layer electronic module is manufactured. In the previous description it was explained how a double-sided, single-layer module is manufactured by the present technique. In view of this description it will be appreciated that the encapsulated components and corresponding channels are made by the technique in FIGURES 1 through 8 and described in the specification associated with these drawings. That is, in this embodiment, module 73 of FIGURE 12 is equivalent to module 55 of FIGURES 7 and 8. After module 73 has been manufactured in the manner previously described, tubings 75 are placed over certain predetermined lead wires and are fixedly attached to module 73 by means of epoxy 77 or other suitable adhesive material. The reason for covering the lead wires by means of tubing 75 is to protect them from bending and process contamination which is necessary to be performed in the channels and on the clipped lead wires. Those lead wires which are connected only to the bottom layer of circuitry are clipped as illustrated in FIGURE 12.

The next step it to deposit conducting material on surface 79, channels 81 and clipped lead wires 83. This deposition of conducting material may be performed by the previously mentioned techniques. After this material has been deposited, channels 81 containing lead wires 83 are then filled with an epoxy or channels 81 and lead wires 83 have their surfaces coated with a substance such as acid-resisting paint, which is neutral to an etching solution. After these channels and lead wires have been coated the entire module is etched, preferably by spray etching, to remove the conducting material from surface 79. Tubings 75 are then removed by breaking the adhesive 77 surrounding the bases thereof.

The next operation is to mount module 73 in jig 85, as illustrated in FIGURE 13, which may be the same as or of similar construction to the jig previously described in FIGURE 1. Circuit tool plates 87 and 89 having raised circuit traces 91, which generally differ from the first layer circuitry layout, are mounted in the jig and the extending component lead wires 95 are inserted through the appropriate openings of the circuit tool plates. The separation between exterior surfaces of module 73 and the interior surfaces of circuit tool plates 87 and 89 must be somewhat greater than the height of the raised circuit traces 91 and it has been found that ⅛ inch is satisfactory for most operations. The spaces between module 73 and circuit plates 87 and 89 are enclosed on three sides, by appropriate side plates, in much the same manner as illustrated in the previously-described embodiment and as best depicted in FIGURE 4. After these spaces have been enclosed they are filled with epoxy and, after curing, the various side plates, not shown, are removed and circuit tool plates 87 and 89 are also removed resulting in the formation of channels which interconnect lead wires 95 in a predetermined manner. The lead wires are then clipped flush with the upper surface and the channels, lead wires and upper surfaces are then coated with a conducting material. As illustrated in FIGURE 14, the conducting material deposited on upper surface 97 is then removed which results in the formation of channels 99 having a coating of copper and thereby interconnecting the components in a predetermined manner. All of the steps are not described in the embodiment illustrated in FIGURES 12 through 14 since those not described or shown will be obvious to one skilled in the art from the discription and drawings relating to the first embodiment. It will be appreciated by those skilled in the art that additional layers may be formed by leaving certain predetermined lead wires unclipped and forming the additional layers in the same manner as was the second layer.

In FIGURES 15 and 16 is illustrated still another embodiment of the present invention. This embodiment is directed to a single-sided, single-layer circuitry. FIGURE 15 shows circuit tool plate 101, header 103 having pins 105 and electrical components 107. It will be appreciated that circuit tool plate 101 and header 103 contain silastic material 109 which functions in the manner previously described with relation to the first embodiment. After the electrical components are inserted through the openings in the raised circuit traces 111, mold cover 113 and side plate 115 and 117 are attached to circuit tool plate 101 and header 103. Then the cavity formed between these members is filled with epoxy or the like resulting in the formation of module 119 as illustrated in FIGURE 16. The extending lead wires 121 are then clipped flush with surface 123. Then clipped lead wires 121, surface 123 and channels 125 are coated with a conducting material, by methods previously described, and the conducting material on surface 123 is then removed by a lapping process or the like.

Figure 18:
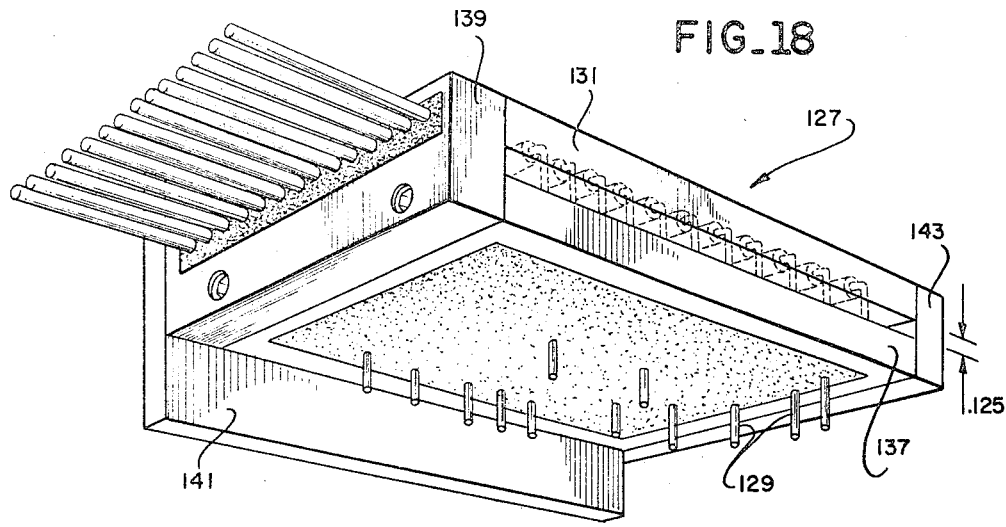
FIGURE 18 is a pictorial view of the module mounted in the molding jig of the fourth embodiment of the present invention.
Figure 19:
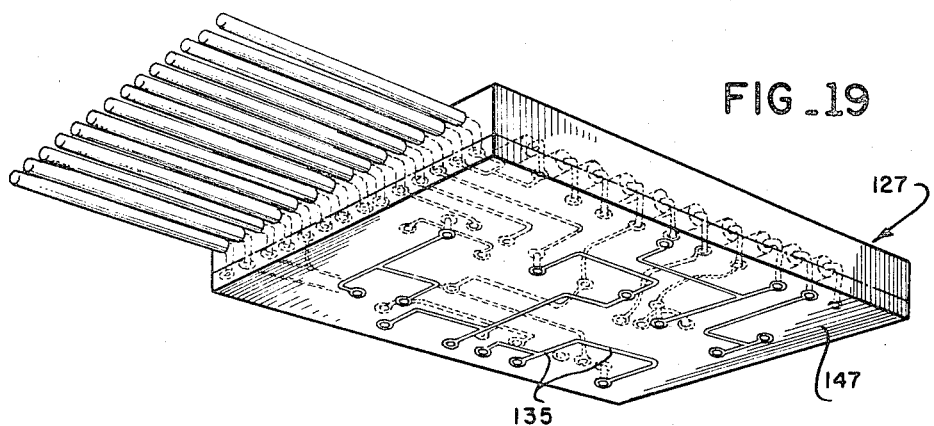
FIGURE 19 is a pictorial view of the module after encapsulation by the techniques shown in FIGURE 18.
Figure 20:
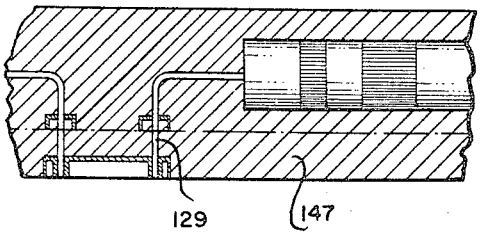
FIGURE 20 is an enlarged sectional view of the module illustrated in FIGURE 19.

In FIGURES 17 to 20 is shown still another embodiment of the present invention. This embodiment pertains to a single-sided multi-layer circuit module. In FIGURE 17 is illustrated partial module 127 consisting of encapsulated electrical components, extending lead wires 129 some of which are clipped adjacent to surface 131, and some of which are left extending and covered by tubings 133. The particular method for arriving at this construction was previously described with relation to the previous embodiments. It will be apparent from this previous description that surface 131, the clipped lead wires 129 and channels 135 are first coated with conducting materials, then the channels and clipped lead wires are acid protected, and then the conducting material on surface 131 is etched away. Referring to FIGURE 18, the next step of this process is to mount partial module 127 in a jig having circuit tool plate 137, header 139 and side plates 141 and 143. The space between surface 131 and circuit tool plate 137 is filled with epoxy resulting in the formation of module 127, shown in FIGURE 18. It will be appreciated that circuit tool plate 137 has raised circuit traces which correspond to the extending lead wires which result in the formation of channels 135. Surface 147, channels 135 and the clipped lead wires are then coated with a conducting material and the conducting material is then removed from surface 147 as depicted in FIGURE 20. The module channels and lead wires may then be protected by adding a coating of epoxy or other nonconducting material to surface 147.

It will be appreciated by those skilled in the art that in many instances it will be desirable to coat the exterior surfaces of the finished modules of the previously described embodiments. This may be accomplished, for example, by placing module 119 of FIGURE 16, after the plating and finishing processes have been completed, in a flat plate mold having a very small space between surface 123 and the interior flat surface of the mold. Epoxy is then poured into the space and then the module is removed with a completed exterior finish. This same technique may be used on both sides of double sided modules.

It is to be understood in connection with this invention that the embodiments shown are only exemplary, and that various modifications can be made in construction and arrangement within the scope of the invention as defined in the appended claims.

What is claimed is:

1. A device for making electronic modules consisting of at least one circuit tool plate having a plane surface, at least one circuit trace extending upward from said plane surface, said at least one circuit trace interconnecting lead wire holes formed in the at least one circuit tool plate and at about the ends of said at least one circuit trace with the axis thereof about normal to said plane surface, an enclosure, at least one wall of said enclosure consisting of said at least one circuit plate.

2. A device for making electronic modules consisting of two circuit tool plates, each circuit tool plate having a plane surface, a plurality of circuit traces connected to said plane surface of each circuit tool plate, each of said circuit traces extending upward from the plane surface, at least two lead wire holes formed in each of said circut traces and extending through the corresponding circuit tool plate, the axis of each hole being about normal to the plane surface of the corresponding circuit tool plate, an enclosure, each of said circuit tool plates forming oppositely disposed walls of said enclosure with the circuit traces of each of said tool plates forming part of the interior surface of said enclosure.

3. A device for making electronic modules consisting of two circuit tool plates, each circuit tool plate having a front plane surface and a back surface, each circuit plate having an elastic material attached to said back surface, a plurality of circuit traces extending upward from the front plane surface, lead wire holes formed at about the ends of each of said circuit traces and extending through the corresponding circuit tool plate and adjacent to said elastic material attached to said back surface, an enclosure, each of said circuit tool plates forming oppositely disposed walls of said enclosure with the circuit traces of each of said tool plates forming part of the interior surface of said enclosure.

References Cited

UNITED STATES PATENTS

| | | |
|---|---|---|
| 2,510,841 | 6/1950 | Stowe. |
| 3,019,489 | 2/1962 | Burg. |
| 3,120,029 | 2/1964 | Gingrande et al. _____ 18—36 X |
| 3,263,304 | 8/1966 | Falanga et al. _____ 264—272 X |

J. HOWARD FLINT, JR., *Primary Examiner.*